US000001493H

United States Statutory Invention Registration [19]

[11] Reg. Number: H1493

[45] Published: Oct. 3, 1995

Osofsky et al.

[54] USE OF COLOR OF POLARIZATION INDICATOR OF HIGH $T_C$ SUPERCONDUCTORS IN PRODUCTION AND PROCESSING OF SUPERCONDUCTORS, AND APPARATUS THEREFOR

[76] Inventors: Michael S. Osofsky, 3820 Wildlife La., Burtonsville, Md. 20866; Henry A. Hoff, 9108 Ashmeadow Ct., Lorton, Va. 22079; William L. Lechter, 10015 Picea Ct., Mt. Airy, Md. 21771

[21] Appl. No.: 711,773

[22] Filed: Jun. 7, 1991

[51] Int. Cl.[6] ..... G01N 21/21

[52] U.S. Cl. ..... 356/369; 356/364; 505/725; 505/726

[58] Field of Search ..... 356/327, 364, 356/369; 505/725, 726

[56] References Cited

U.S. PATENT DOCUMENTS

| | | | |
|---|---|---|---|
| 4,766,551 | 8/1988 | Begley | 356/448 |
| 5,046,846 | 10/1991 | Ray et al. | 356/326 |

OTHER PUBLICATIONS

Theeten et al., "In Situ Measurement and Analysis of Plasma–Grown GaAs Oxides with Spectroscopic Ellipsometry" J. Electrochem. Soc: Solid–State Science and Technology, vol. 127, No. 2 (Feb. 1980) pp. 378–385.

*Primary Examiner*—Bernarr E. Gregory

[57] ABSTRACT

The unique color of polarization of superconducting materials, especially cuprates, is used in a process for quality control and monitoring in the manufacture and processing of superconducting materials, including the synthesis of such materials and the post synthesis fabrication of superconducting materials/devices. The apparatus and method expose a material believed to contain a superconducting phase to polarized light from a daylight source. The light reflected by the sample is then cross-polarized with respect to the illuminating light, and its spectrum is reviewed for the color of polarization characteristic of a superconducting material. The information thus gained is used to control and monitor various processes used to prepare and shape superconducting materials. A significant advantage of the present invention is that the monitoring and control may be performed at temperatures above $T_c$, and in an assembly line fashion.

18 Claims, 3 Drawing Sheets

USE OF COLOR OF POLARIZATION INDICATOR OF HIGH $T_C$, SUPERCONDUCTORS IN PRODUCTION AND PROCESSING OF SUPERCONDUCTORS, AND APPARATUS THEREFOR

BACKGROUND OF THE INVENTION

1. Field of the Invention

This invention relates to superconductive materials, and is more particularly directed to a novel method for detecting, within ceramic substances, phases that exhibit superconductivity.

2. Description of the Prior Art

At low temperatures certain metals, intermetallic compounds and ceramics exhibit superconductivity, having zero resistivity and diamagnetic susceptibility. Of particular interest to the electronic scientist is the crystalline structure of a particular class of ceramic compounds that exhibits superconductivity at relatively high temperatures.

The temperature at which a material become superconducting is designated as that materials transition temperature ($T_c$). The transition to a superconductor which occurs at the $T_c$ is actually an electronic transition, i.e., a change in the energy states of the electrons within the crystal lattice, and is not due to a change in the crystal lattice itself. It has been found that certain complex copper oxide materials can have crystalline phases which, at temperatures above that of liquid nitrogen, exhibit superconductivity. Nonetheless, while these phases exist above the $T_c$, the energy states of the electrons within the crystalline lattice changes at the $T_c$. Illustrative superconductive materials of this class include materials having the chemical formula $YBa_2Cu_3O_x$ and $ErBa_2Cu_3O_x$ (commonly referred to as the "1-2-3" or "123" superconductors, although a more accurate designation, which is sometimes used in the art, is "1-2-3-7" or "1237") and $Bi_2Sr_2CaCu_2O_8$ (known in the art as "BSCCO"), and classified as cuprate superconducting materials.

It is essential to determine whether and to what extent a substance contains crystalline phases which exhibit superconductivity at appropriately low temperatures. Prior techniques employed to determine the presence and quality of superconductive materials in substances include electrical measurement, magnetic measurement, thermal luminescence measurement, and structural analysis by x-ray and neutron diffraction measurement.

Electrical and magnetic properties of a superconductor have been measured to determine the presence of superconductive cuprate phases. As pointed out above, superconductivity is defined by zero resistivity and diamagnetic susceptibility. However, in the cuprate system these properties exists only at temperatures in the range of liquid nitrogen, 77 K. Therefore, when employing techniques to directly measure electrical and magnetic properties, the materials must be cooled to or below the temperature at which the superconductive properties can be observed.

The terminal techniques include bombarding the materials with gamma rays at elevated temperatures, heating the bombarded materials to and then observing the emission of photons by a suitable photo-detector, to determine the presence insulating impurity phases. This technique requires heating the material to at least 400° C.

X-ray and/or neutron diffraction are conducted at room temperature, and identify the crystal lattice structure of the material to determine if the desired superconducting compound is present. Nevertheless, x-ray diffraction and neutron diffraction detect only the geometry of the crystal lattice and the relative positions of the atoms within the crystal lattice. Because two cuprates may share analogous crystal lattice, without sharing the ability to superconduct at appropriately low temperatures, x-ray and neutron diffraction are capable of determining whether a specific material will superconduct only if the data obtained is compared with the x-ray or neutron diffraction pattern of a known cuprate superconductor. Thus x-ray and neutron diffraction data alone cannot determine whether a specific material is capable of exhibiting superconductivity at reduced temperatures.

It has been known that the superconducting crystalline phases of any specific complex cuprate oxide will exhibit a characteristic golden color of polarization, while the non-superconducting crystalline phases of nominally the same cuprate oxide will not alter the spectrum of polarized light in the same way. For example, tetragonal 123, which is not superconducting, will not alter the reflected spectrum of polarized light in the same way as orthogonal 123 (actually 1237), which is superconducting and exhibits the characteristic golden color of polarization. The characteristic golden color is believed to be due to a combination of two absorption bands in the $CuO_2$ planes and an extension of the free-carrier distribution into the visible.

It was also known that the characteristic golden color of polarization of the cuprate superconducting materials was not exhibited by non-superconducting cuprate having the same crystal lattice geometry as their superconducting analogs. For example, While both $ErBa_2Cu_3O_{6+x}$ ($0 \leqq x \leqq 1$) and $PrBa_2Cu_3O_{6+x}$ ($0<x<1$) transform from tetragonal to orthorhombic as the oxygen concentration is increased, only $ErBa_2Cu_3O_{6+x}$ ( $0<x<1$ ) becomes a superconducting material by virtue of that transformation, and $ErBa_2Cu_3O_7$, but not $PrBa_2Cu_3O_7$, exhibits the characteristic golden color of polarization.

Before the present invention, however, color of polarization measurements had not been used for quality control over the production of superconducting materials, or for automation of the production of superconducting materials.

SUMMARY OF THE INVENTION

It is an object of the present invention to analyze a substance to determine the presence and/or concentration of materials capable of superconducting at reduced temperatures.

It is another object of the present invention to monitor the production of a superconducting material by observing the growth of crystalline phases responsible for superconductivity.

It is a further object of the present invention to control quality during the production of superconducting materials.

It is yet another object of the present invention to control quality during the synthesis of powders, single crystals and thin films of superconducting materials.

It is a yet further object of the present invention to control the processing of superconducting materials during post-synthesis fabrication.

Other objects of the invention will become obvious to those skilled in the art upon reading the foregoing application.

Generally, anisotropic materials have their own characteristic color when viewed with a microscope in reflected polarized light through crossed polarizers. However, if the structure or composition of the material is changed, the polarization color changes.

It has been remarkably found that a cuprate superconductor i.e., a superconductor in which the main component of the material is copper oxide, has a similar color of polarization independent of changes in structure and/or composition.

More specifically, the superconductive phases of the cuprate superconductors, when viewed as described hereinabove, always exhibit a brownish yellow color under a xenon polarized light source. It has been also remarkably found that the aforementioned color observance always indicate superconductivity in the presence of copper oxide materials, even though copper oxide, itself, does not have the aforestated color.

While this observation of color is not a replacement for the measurement of magnetization, resistivity, and susceptibility that determine the existence and onset temperature of superconductivity, as stated, the presence of the brownish yellow, or "golden" color always indicates the cuprate grains that are superconductive in the material.

Illustratively, the technique is accomplished by securing a sample cuprate material within the path of a high intensity light source (such as a xenon lamp). Ideally, the path of the light should travel through a first polarizer and a first lens, before striking the sample.

The path of light is next reflected from the sample through a second lens and second polarizer onto a suitable spectrophotometer, such as a wavelength sensitive photodetector.

In utilizing this system, the first polarizer and first lens ideally are oriented 90 degrees with relation to the second polarizer and second lens, to achieve maximum intensity of the reflected light onto the spectrophotometer.

Resulting data from the spectrophotometer indicating a brownish-yellow or "golden" color is significant evidence that the sample is superconductive.

BRIEF DESCRIPTION OF THE DRAWINGS

The above invention will become apparent from the following detailed description, accompanied by the following drawings, in which.

DETAILED DESCRIPTION OF THE PREFERRED EMBODIMENTS

Figure 1:
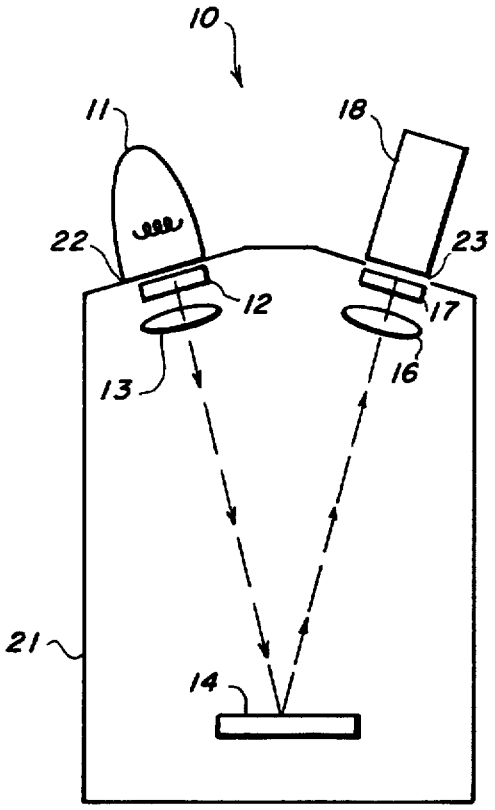
FIG. 1 is a schematic view of a system for visually observing the color of polarization of cuprate specimens; according to the present invention.

Referring now to FIG. 1, an optical system 10 utilized to determine the superconductivity of a cuprate material, in accordance with the present invention, includes a light source 11, capable of transmitting light through a first polarizer 12, and a lens 13 onto a sample material 14. The transmitted light is reflected from the material 14 through a second lens 16, a second polarizer 17, and to a detector 18.

The light source 11 may be any of the conventional light sources capable of providing bright, high intensity light, in the day light range, such as xenon lamp. The polarizers 12, and 17 and the lens 13, and 16, also may be any conventional type, well known commercially in the art, and not a subject of the present invention.

Ideally, the polarizer 12 is oriented at 90° angle to the polarizer 17 to promote maximum polarized intensity of the reflected light onto the detector 18.

The detector 18 of FIG. 1 illustratively is a spectrophotometer, which is a conventional wavelength sensitive photodetector. However, any suitable detector of this type may be employed in the system 10.

Suitably, the system 10 may be mounted to and enclosed in a light absorbing container 21, such as a black box. It is necessary for the interior of the container 21 to absorb light to preclude that light entering the container which is not transmitted to the sample 14 from being reflected and transmitted to the detector 18.

In FIG. 1, the light source 11 is conveniently mounted in a first opening 22 in the top of container 21. The detector 18 is mounted in a second opening 23 in the container 21. The polarizer 12 and the lens 13 are suspended from the opening 22 within the container 21 and the path of light transmitted from the source 11. Likewise, the polarizer 17 and the lends 16 are suspended from the opening 23 within the container 21 and in the path of light reflected from the sample 14.

The sample 14, to be examined, may be in the form of powder, compacted polycrystalline disc, or single crystal, or thin film.

In a preferred embodiment of the invention, compacted discs of different cuprate materials under investigation were prepared in a known manner, such as by hot isostatic pressing or by sintering. The surface of the sintered discs were polished by known ceramic techniques, and each disc was individually secured as a sample 14, for sequential testing in the container 21. (FIG. 1). Each sample 14 was aligned to intercept light transmitted from the source 11, and reflect light to the detector 18 at a minimum angle of reflectivity to insure measurements close to normal reflectivity.

The various materials tested were $YBa_2Cu_3O_7$, $ErBa_2Cu_3O_7$, $NdBa_2Cu_3O_7$, $PrBa_2Cu_3O_6$, $PrBa_2Cu_3O_7$, $Bi_2Sr_2CaCu_2O_8$, and $Tl_2Ba_2Ca_2Cu_3P_{10}$.

The observations noted by the detector, in each case, were recorded at room temperature utilizing a camera employing Kodak Versicolor type III S professional film, and the results are listed in Table I.

TABLE I

| COLOR OF POLARIZATION | |
|---|---|
| Material | Color |
| $YBa_2Cu_3O_7$ | brownish-yellow |
| $ErBa_2Cu_3O_7$ | brownish-yellow |
| $NdBa_2Cu_3O_7$ | brownish-yellow |
| $PrBa_2Cu_3O_6$ | grayish-blue |
| $PrBa_2Cu_3O_7$ | grayish-brown |
| $Bi_2Sr_2CaCu_2O_8$ | brownish-yellow |
| $Tl_2Ba_2Ca_2Cu_3O_{10}$ | brownish-yellow |

The results in Table I indicated that the Y, Er, Nd, Bi, and T1 cuprates are superconductive. This superconductivity was confirmed by conventional physical measurements of each of the above samples, including susceptibility, magnetization, and resistivity tests.

Conversely the results in Table I indicated that the Pr cuprate is not superconductive. Characteristic conventional tests also indicate that this material is not superconductive.

It has also been observed, by techniques according to the present invention, that the superconductivity of the $ABa_2Cu_2O_7$ type materials can be destroyed by decreasing the oxygen concentration of these materials.

Typical samples of single crystal Y cuprate were prepared by quenching from progressively higher temperatures to form a first crystal having the cuprate formula $YBa_2Cu_3O_7$ and a second crystal having the cuprate formula $YBa_2Cu_3O_6$. The chemical formula of each crystal was determined by conventional techniques prior to testing according to the present invention.

The respective cuprate crystals were individually secured in the container 21, as a sample 14, and tested for color of polarization in the same manner as the materials of Table I. The 12 observations were recorded and the results are listed in Table II.

TABLE II

| COLOR POLARIZATION | |
|---|---|
| Material | Color |
| $YBa_2Cu_3O_7$ | brownish-yellow |
| $YBa_2Cu_3O_6$ | colorless |

The results in Table II indicate that the $YBa_2Cu_3O_7$ crystal is superconductive, while the $YBa_2Cu_3O_6$ crystal is not. These results were confirmed by conducting standard conventional tests on the crystals, as described hereinbefore.

Er cuprate powders having decreasing oxygen content were prepared in a manner similar to that performed on the Y cuprate crystals to produce a first powder having the cuprate formula $ErBa_2Cu_2O_{6.5}$, a second powder having the formula $ErBa_2Cu_3O_{6.4}$, a third powder having the formula $ErBa_2Cu_3O_{6.3}$, and a fourth powder having the formula $ErBa_2Cu_3O_6$.

Testing was performed in a manner similar to the testing of materials in Table I and Table II, and the results are listed in 4 Table III.

TABLE III

| COLOR OF POLARIZATION | |
|---|---|
| Material | Color |
| $ErBa_2Cu_3O_{6.5}$ | brownish-yellow |
| $ErBa_2Cu_3O_{6.4}$ | grayish-brown |
| $ErBa_2Cu_3O_{6.3}$ | grayish-blue |
| $ErBa_2Cu_3O_{6.0}$ | colorless |

The results in Table III indicate that only $ErBa_2Cu_3O_{6.5}$ is superconductive, according to the present invention. Standard testing also confirm these results.

Moreover, the results in Table III significantly reveal that decreasing the oxygen gradually from a cuprate superconductor, changes that color of polarization in gradients from the superconductive identifying brownish yellow found in the $Cu_3O_7$ complex to a colorless polarization in the $Cu_3O_6$ complex.

The above data, according to the present invention, additionally provides a necessary tool for quality control techniques in manufacturing superconductive cuprate materials. Illustratively, should a cuprate material be incompletely processed, (e.g., processed to a formula that is not superconductive) the extent of the incompleteness may be measured by the color of the polarization of the material.

Figure 2:
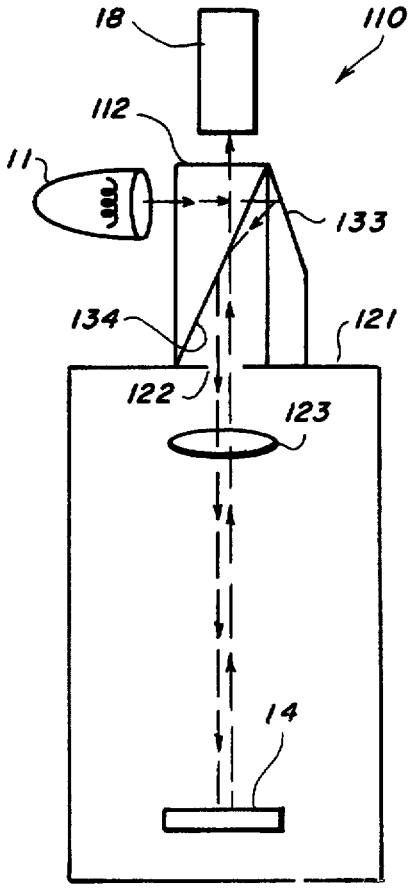
FIG. 2 is a schematic view of an alternate system for observing the color of polarization of the specimens.

An alternate optical system which may be employed in the present invention is shown in FIG. 2.

An optical system 110 includes a prism 112, mounted to a container 121, and overlying an opening 122 therein.

The prism is commercially known as a Foster calcite prism, and includes a first inclined surface 133, and a second inclined surface 134. Both the surface 133 and the surface 134 are polarized. Light from a source 11 is transmitted to the first surface 133 of the prism 112. The light is reflected to the second surface 134 and transmitted through the opening 122, a single lens 123, and to a sample 14 secured in the container 121. The light is next reflected back through the opening 122 and onto a suitable detector 18.

The use of the prism 112 obviates the need for employing polarizers 12 and 17 (FIG. 2), and eliminates the necessity of employing two lenses 13 and 16 in the system 10. It also eliminates the necessity of having two openings 22 and 23 in the container 21.

Utilizing the present invention, it is to be understood that in lieu of examining a single sample 14 by the system 10, a series of the samples may be passed through the system, in assembly line fashion, such as by securing a plurality of samples sequentially on an endless moving conveyor belt and passing each sample successively through the system for observation.

Figure 3:
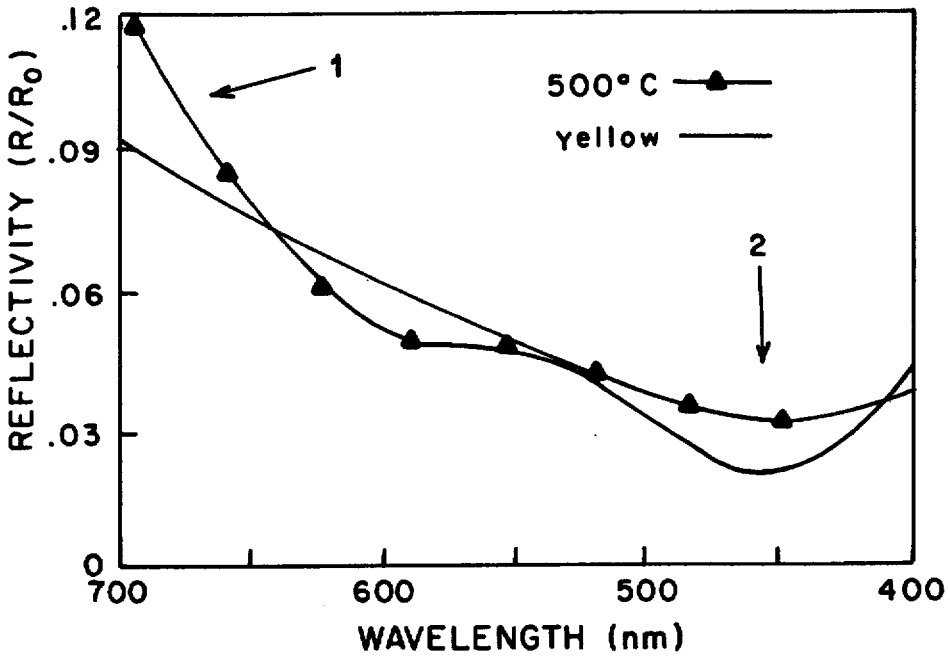
FIG. 3 is a comparison of the spectra of cross-polarized light reflected from $ErBa_2Cu_3O_7$ with pure yellow.

FIG. 3 contains reflectivity data across the visible spectrum obtained through crossed polarizers from individual grains of a sample of $ErBa_2Cu_3O_7$ superconductor ($T_c$~95 K). The sample was quenched from 500° C. after ~48 hours of annealing in oxygen. The reflected light intensity is for specific wavelengths produced by a grating monochromator inserted between the light source and sample and normalized for the light source. A smooth curve has been iteratively fitted through the data to allow calculation of chromaticity coordinates. Plotting these coordinates on a chromaticity diagram with the color (hue) fields known has confirmed that the color observed is an orange-yellow which corresponds with the golden color seen visually and photographed. The major structural features of the spectrum, numbered "1", "2" and "3", correspond to a steadily increasing reflectivity from ~600 nm into the infrared that is consistent with the presence of free-carriers responsible for superconductivity and two absorption bands, one in the blue (2), respectively. The absorption band in the blue has been observed by ellipsometry and attributed to the Cu3 $d_x2_{-y}2$ orbital. The other band, "3", and also been attributed to the Cu3$d_x2_{-y}2$ orbital.

The reflectivity spectrum shown in FIG. 3 has also been observed for the other cuprate superconductors, with the same structural features as denoted. Although it is visually difficult to differentiate yellow from golden in the very low light conditions through crossed polarizers, reflectivity measurements allow differentiation, as can be seen in FIG. 3 by comparing the golden curve with the yellow one. As some impurities are yellow, this differentiation is significant. The structural feature "1" of FIG. 3 continues to increase into the infrared, unlike the reflectivity from any nonsuperconducting impurity.

Figure 4:
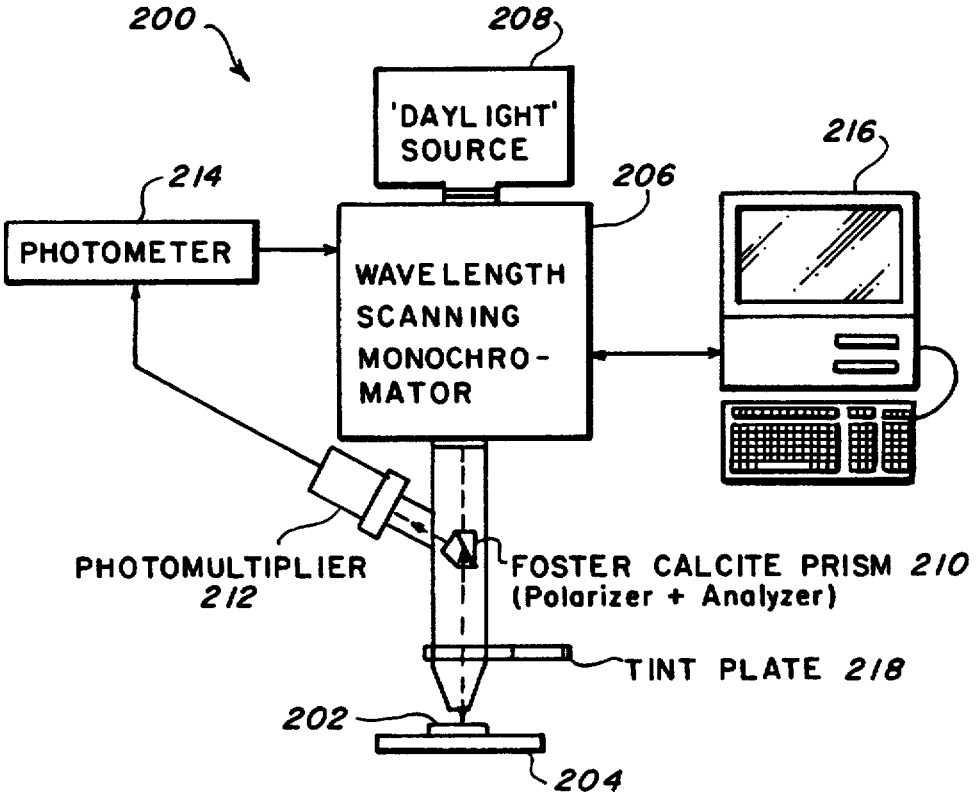
FIG. 4 is a schematic view of another alternate system for observing the color of polarization of materials, and is particularly useful in automated analysis of thin films.

FIG. 4 shows another alternative apparatus 200 for use according to the present invention. Substrate 202 rests on support 204, which may be, for example, a conveyor belt.

Wavelength scanning monochromator scans a band of light from high intensity source 208 within the region of interest (about 400 to 700 nm), so that sample 202 is scanned with polarized light from Foster calcite prism 210 over this region. Sample 202 reflects the polarized light. This reflected polarized light is cross-polarized by Foster calcite prism 210 and then amplified by photo-multiplier 212. Photomultipliers of the u.v.-visible type can be used as they are generally receptive out to 900 nm. The amplified light is then detected by photometer 214 and correlated with the wavelength and intensity of the illuminating light. The intensity of the reflected, cross-polarized light is then plotted by computer 216 across the wavelength region scanned.

While a scan of wavelengths between about 400 and 700 nm is preferred, it is possible to obtain good results while comparing the intensity of the cross-polarized reflected light with that of a known essentially pure superconductor at only one or more peak wavelengths within that region. As can be seen from FIG. 3, the intensity of the cross-polarized light from a cuprate superconductor is highest at about 700 nm. The wavelength band in and around 700 nm is therefore the most sensitive to the presence and concentration of a superconducting phase in a material being examined.

The concentration of superconducting material in a sample may be determined by comparing the intensity of the sample's reflected cross-polarized light in the wavelength region of about 400 to 700 nm (or at a wavelength of peak intensity within that band for reflection of cross-polarized light from a known superconductor) with the intensity of a known superconductor's reflected crosspolarized light at or across the corresponding wavelength or wavelength region. A lower intensity for the sample corresponds to a lower concentration of the superconducting phase within the sample. Samples which are essentially single phase superconductors will have essentially the same intensity as the standard, known superconductor at corresponding wavelengths within the region of 400 to 700 nm. Additionally, the reflected, cross-polarized image may be visually examined. A ratio of the area of this image which has the golden color of polarization of a cuprate superconductor to the area of this image which lacks that color will usually be proportionate to the concentration of the superconducting phase in the material being examined. This image can be photographed for future reference.

For materials which have reflectivities below the resolution of the photo-multiplier, there is an equivalent alternative approach. For this approach one polarizer (rather than the Foster prism) is inserted, the spectrum recorded, then the polarizer is removed. A second polarizer (which is 90° to the first) is inserted and the spectrum recorded. By subtracting the second spectrum from the first, the spectrum which results is the same as would be detected through crossed polarizers.

Manual inspection by the inclusion of an eyepiece (not shown) may be desired for use of the tint plate 218 with preliminary thin films. Upon producing superconducting thin films with high $J_c$, the automatic scanner can be used for quality control or for area percent measurements. Area percent measurements are best accomplished by rotating the optical system about the microscope axis through 90° to ensure that all grains are measured as at any given angle some grains may be extinct. To automate the inspection of preliminary thin films, reflectivity spectra through tint plate 218 can be generated, especially for the identifying grains exhibiting the second order blue, by using known superconductors.

Figure 5:
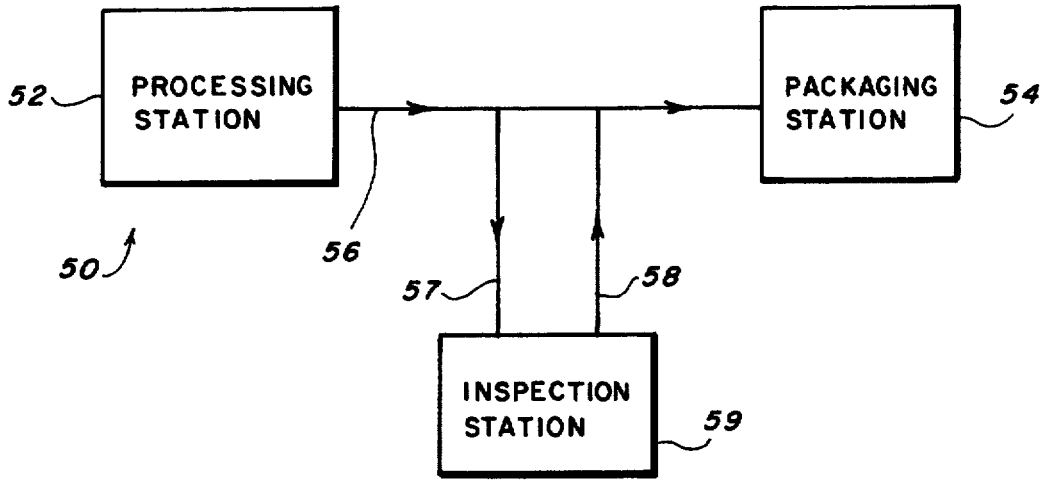
FIG. 5 is a schematic view of a quality control system according to the present invention.

FIG. 5 shows a typical apparatus 50 for monitoring the quality of superconductors produced at processing station 52. After the starting materials are processed by any known means at processing station 50 to form a superconducting material, the processed material is carried by conveyor 56 to packaging station 54, where the finished superconductors are prepared for shipping or use in an electronic component. All or some samples of the processed materials are diverted to conveyor 57 to inspection station 59, where they are inspected for the presence of the superconducting phase by an apparatus similar to those shown in FIGS. 1 and 2. Samples which pass inspection are forwarded to conveyor 57 by conveyor 58. Samples which fail inspection are disposed of or returned, by means not shown, to the processing station for further processing. The operator may decide whether the failure of a sample to pass inspection warrant a temporary shut down and/or modification of the processing performed at processing station 52.

Conveyors 56, 57 and 58 may be any known conveying means, such as an endless belt or a mechanical or robotic arm. Of course, material may also be hand-carried between the processing, inspection and packaging stations may also be done manually, without the use of specific conveying means. Additionally, conveyor 56, 57 and 58 may be combined into one or two conveyors which serves as the means for transporting material from the processing station to the inspection and/or packaging station and from the inspection station to the packaging station.

The selection of samples for diversion to inspection station 59 may be done manually or automatically in any desired pattern compatible with good quality control.

In addition to controlling the quality of superconductors as they are produced/synthesized from raw materials, it is helpful to monitor and control the processing of previously produced superconductors to assure that post-synthesis processing/device fabrication does not destroy the superconductive phase. For example, it is desirable to melt cast superconducting materials into useful objects. During the post-cast oxygen anneal, the superconducting material should be monitored to assure that the finished product will be superconducting. The information obtained during monitoring can be used to control time period or oxygen flow rate through site ports. Further, similar technology should be useful in monitoring the production of superconducting materials from non-superconducting precursors.

Figure 6:
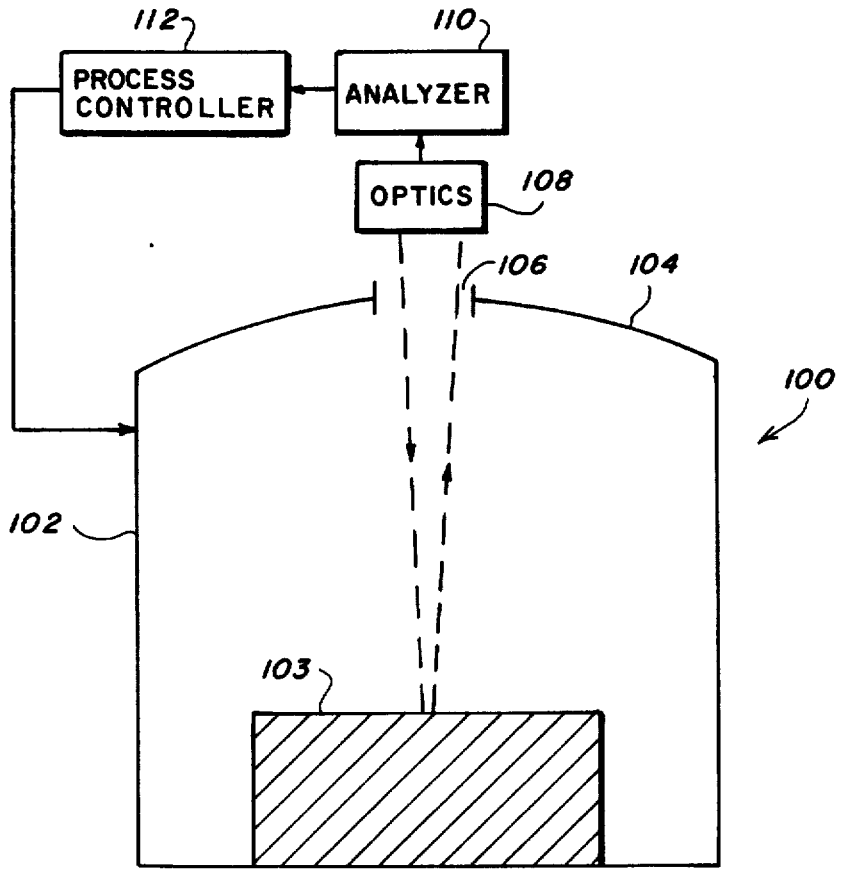
FIG. 6 is a schematic view of a process monitoring system according to the present invention.

FIG. 6 shows an apparatus 100 according to the present invention useful in monitoring the processing of superconducting materials and their precursors. Processing station 102 is used to process material 103. Processing station 102 may be, for instance, an furnace in which starting materials are annealed to form superconducting material, or an apparatus used to hot isostatically press a previously formed superconducting material. Side 104 of processing station 104 includes a window 106 which permit the entry of polarized source light from optics 108 and the escape of reflected light into optics 108. Optics 108 is a device, similar to that shown in FIGS. 1 and 2 and including a high intensity light source, a first polarizer for polarizing light from the high intensity light source, and a second polarizer for polarizing light reflected from materials 103, and any needed or desired lenses. Analyzer 110 detects the reflected, polarized light from materials 103 after further polarization by the second polarizer of optics 108, and then spectrographically analyzes this cross-polarized reflected light, for example, by direct or indirect comparison of the spectrum obtained with that of a standard known, for example from NMR analysis, to be essentially pure. The extent to which the obtained spectrum matches that of the standard should correspond well with the concentration of a superconducting phase within material 103. The information obtained by this analysis is then sent to process controller 112, which uses this information to control those parameters known to affect the superconducting properties of the material being processed, e.g., time and temperature of treatment, rate of cooling during anneal, etc.

The specific physical arrangement of the apparatus of FIG. 6 is not critical. For example, the polarizers of optics 108 and window 106 may be combined by employing a Foster calcite prism as the window. Preferably, optics 108, or at least parts thereof may be translated with respect to the sample to permit scanning of as much of the sample as possible through window 106. Also, a tint plate (not shown) may be inserted between the polarizers. Analyzer 110 and process controller 112 may be conventional systems used for spectrographic analysis and process control, respectively. Analyzer 110 may also receive light from the source, lens or first polarizer of optics 108 to correct, in a known manner, for variations in the intensity of the light source and/or other imperfections in the optical system.

The present invention is particularly useful in the production of thin films. The illuminating light should penetrate sufficiently deeply into the films to provide for analysis of the entire specimen. With powders, the unique and random orientation of the powder particles, which could interfere with the present invention, could perhaps be overcome by agitation and/or rotation of the sample, thus permitting the individual particles to rotate relative to the polarizers, creating an "averaging" effect. Representative samples of bulk superconductors are preferably tested according to the present invention both at their outer surface and after cross-sectioning, so more than the surface of the sample is observed.

Further details and information relevant to the present invention may be found in Hoff et al., *Materials & Manufacturing Processes*, 5(3) , 397–410 (1990); Hoff et al., *Physica C* 162–164 (1989) 1115–1116; Hoff et al., *Mat. Res. Soc. Symp. Proc.*, Vol 169. pages 361–364 (1990); Hoff et al., "The Color of Polarization in Cuprate Superconductors ", *Advances in Material Science and Applications of High Temperature Conductors*, L. H. Bennett and Y. Flom, eds., NASA, 1991, pages 97 through 106; Hoff et al., *J. of Superconductivity*, vol. 1, No. 1 (1988) pages 35–44; Hoff et al., *JOM*, , Vol. 42, No. 6, pages 10–15; and Hoff et al., "Optical and Electron Microanalysis of Cuprate Superconductors", *High Temperature Superconducting Compounds II*, Whang et al., eds., The Minerals, Metals & Materials Society, 1990, pages 407 through 419, all of which are wholly incorporated herein by reference.

Whereas this invention is herein described with respect to preferred embodiments, it should be realized that various changes may be made to the invention without changing the scope thereof.

What is claimed is:

1. A method of quality control in the production of superconductor materials, comprising the steps of:

(a) providing a processing station, at which precursors for the production of superconductors are processed to form superconducting materials; a packaging station, where materials processed at said processing station are packaged for shipment or incorporated into an electronic component; and an inspection station where samples of materials processed at said processing station are inspected for the presence of a phase capable of exhibiting superconductivity, prior to being sent to the packaging station;

(b) inspecting, at said inspection station, a sample of said materials processed at said processing station, by steps including:

(1) illuminating said sample with polarized incident (3)light from a high intensity light source;

(2) polarizing light reflected from said sample in a plane 90° to the plane of polarization of said incident light; and (3) analyzing the spectrum of said reflected polarized light from said sample by comparison of said spectrum with an analogous spectrum of a standard known to be said phase in essentially pure form, whereby a characteristic color of polarization is indicative of the presence of a superconducting material in said sample.

2. The method of claim 1, wherein said starting materials include cuptic oxide and said superconducting materials are cuprate superconductors.

3. The method of claim 2, wherein said high intensity light source is a daylight source with a color temperature of about 5400K to about 7000 .

4. The method of claim 2, wherein said incident light and said reflected light are polarized in orthogonally oriented planes by a Foster calcite prism.

5. The method of claim 2, further comprising the step of providing a means for conveying said processed materials from said processing station to said packaging station.

6. The method of claim 5, further comprising the step of providing a first transfer means for transferring said samples of said processed materials from said conveying means to said inspection station for inspection and a second transfer means for transferring said inspected samples to said conveying means for conveyance to said packaging station.

7. The method of claim 2, further comprising the step of providing a first conveying means for conveying samples of said processed materials from said processing station to said inspection station and a second conveying means for transferring said inspected samples from said inspection station to said packaging station.

8. The method of claim 7, wherein said superconducting material is a thin film.

9. The process of claim 7, wherein said superconducting cuprate material is a thin film.

10. The method of claim 7, wherein said high intensity light source is a daylight source with a color temperature of about 5400K to about 7000K.

11. The method of claim 7, wherein said incident light and said reflected light are polarized in orthogonally oriented planes by a Foster calcite prism.

12. The method of claim 7, further comprising the step of providing a means for conveying said processed materials from said processing station to said packaging station.

13. A method of monitoring the production of a superconducting cuprate material of a desired purity from a non-superconducting precursor, comprising the steps of:

(a) providing a processing station, at which precursors for the production of superconducting cuprate material are processed to form superconducting cuprate material;

(b) processing said precursor material to form said superconducting cuprate material while:

(1) illuminating said material being processed with polarized incident light from a high intensity light source;

(2) polarizing light reflected from said material being processed in a plane 90° to the plane of polarization of said incident light; and (3) analyzing the spectrum of said reflected polarized light from said material being processed by comparison of said spectrum with an analogous spectrum of a standard known to be said phase in essentially pure form;

(4) removing said material being processed from said processing station once said spectrum indicates that said material being processed is a superconducting cuprate material of the desired purity.

14. A method of monitoring the processing of a superconducting cuprate material, comprising the steps of:

(a) synthesizing a superconducting cuprate material;

(b) processing said synthesized superconducting cuprate material to form a fabricated superconducting material while:

(1) illuminating said material being processed with polarized incident light from a high intensity light source;

(2) polarizing light reflected from said material being pressed in a plane 90° to the plane of polarization of said incident light; and (3) analyzing the spectrum of Said reflected polarized light from said material being processed by comparison of said spectrum with an analogous spectrum of a standard known to be said phase in essentially pure form;

(4) removing said material being processed from said processing station once said spectrum indicates that said material being processed is a superconducting cuprate material of the desired purity.

15. A method of quality control in the production of superconductor materials, comprising the steps of:

(a) providing a processing station, at which previously synthesized cuprate superconductors are processed to form fabricated superconducting materials; a packaging station, where said materials processed at said processing station are packaged for shipment or incorporated into an electronic component; and an inspection station where samples of said processed materials from said processing station are inspected for the presence of a phase capable of exhibiting superconductivity, prior to being sent to the packaging station;

(b) inspecting, at said inspection station, a sample of said processed materials from said processing station, by steps including:

(1) illuminating said sample with polarized incident light from a high intensity light source;

(2) polarizing light reflected from said sample in a plane 90° to the plane of polarization of said incident light; and (3) analyzing the spectrum of said reflected polarized light from said sample by comparison of said spectrum with an analogous spectrum of a standard known to be said phase in essentially pure form, whereby a characteristic color of polarization is indicative of the presence of a superconducting material in said sample.

16. A device for quality control in the processing of superconductors, comprising: ( a) a processing station, at which precursors for the production of superconductors are processed to form superconducting materials;

(b) a packaging station, where materials processed at said processing station are packaged for shipment or incorporated into an electronic component; and (c) an inspection station where samples of materials processed at said processing station are inspected for the presence of a phase capable of exhibiting superconductivity, prior to being sent to the packaging station, said inspection station including:

(1) a high intensity light source for illuminating said sample with light;

(2) first polarizing means positioned between said light source and said sample for polarizing said illuminating light;

(3) second polarizing means for polarizing light reflected from said sample in a plane 90° to the plane of polarization of said incident light; and (4) means for analyzing said reflected polarized light from said sample by comparison of said spectrum with an analogous spectrum of a standard known to be said phase in essentially pure form, whereby a characteristic color of polarization is indicative of the presence of a superconducting material in said sample.

17. A device for controlling the quality of a superconductor, comprising:

(a) a processing station, at which a previously synthesized superconducting material is processed to form a fabricated superconducting material;

(b) a packaging station, where fabricated materials processed at said processing station are packaged for shipment or incorporated into an electronic component; and (c) an inspection station where samples of fabricated materials processed at said processing station are inspected for the presence of a phase capable of exhibiting superconductivity, prior to being sent to the packaging station, said inspection station including:

(1) a high intensity light source for illuminating said sample with light;

(2) first polarizing means positioned between said light source and said sample for polarizing said illuminating light;

(3) second polarizing means for polarizing light reflected from said sample in a plane 90° to the plane of polarization of said incident light; and (4) analyzing means for analyzing said reflected polarized light from said sample by comparison of said spectrum with an analogous spectrum of a standard known to be said phase in essentially pure form, whereby a characteristic color of polarization is indicative of the presence of a superconducting material in said sample.

18. A device for monitoring the processing of a superconductor, comprising:

(a) a processing station, at which a previously synthesized superconducting material is processed to form a fabricated superconducting material, said processing station including a window through which is essentially transparent to light having a wavelength of about 400 to 700 nm, and a sample holder means;

(b) a high intensity light source for illuminating a sample upon said sample holder so that light reflected by the sample passes back through said window;

(1) first polarizing means positioned between said light source and said sample for polarizing said illuminating light;

(2) second polarizing means for polarizing light reflected from said sample in a plane 90° to the plane of polarization of said incident light; and (3) analyzing means, outside said window, for analyzing said reflected polarized light from said sample by comparison of said spectrum with an analogous spectrum of a standard known to be said phase in essentially pure form, whereby a characteristic color of polarization is indicative of the presence of a superconducting material in said sample.

* * * * *